United States Patent [19]

Anderson et al.

[11] Patent Number: 5,305,169

[45] Date of Patent: Apr. 19, 1994

[54] ROTARY ACTUATOR DISK DRIVE

[75] Inventors: James C. Anderson, Eagle; Jeffrey S. McAllister, Boise, both of Id.

[73] Assignee: Hewlett-Packard Company, Palo Alto, Calif.

[21] Appl. No.: 893,304

[22] Filed: Jun. 4, 1992

[51] Int. Cl.5 .......................... G11B 5/54; H02K 33/00
[52] U.S. Cl. ...................................... 360/105; 310/36; 310/39; 360/106
[58] Field of Search ................... 360/105, 106; 310/36, 310/39, 43

[56] References Cited

U.S. PATENT DOCUMENTS

| 4,196,456 | 4/1980 | Manzke et al. | 360/106 |
|---|---|---|---|
| 4,855,853 | 8/1989 | Matsushita et al. | 360/106 |
| 4,879,617 | 11/1989 | Sampietro | 360/105 |
| 5,034,837 | 7/1991 | Schmitz | 360/105 |
| 5,122,703 | 6/1992 | Takahashi et al. | 310/36 |
| 5,208,712 | 5/1993 | Hatch et al. | 360/105 |

Primary Examiner—John J. Vrablik
Attorney, Agent, or Firm—E. F. Oberheim

[57] ABSTRACT

A rotary actuator disk drive in which the rotary actuator is driven by a motor comprising a movable coil and a stationary permanent magnet structure producing a magnetic field which links the coil. The rotary actuator comprises a load beam arm stack and a voice coil arm of electrical insulating material such as a light weight plastic, all of which are axially stacked and swaged to a rotary actuator bearing hub which is rotatably mounted in the disk drive. The coil arm of electrical insulating material has a bobbin section on which the coil is directly wound. The coil arm is molded together with the coil arm mounting bushing, a latch pin of magnetic material and an actuator arm balance weight insert molded therein. The latch pin is linked by the permanent magnet field of the motor permanent magnet structure and functions with that structure to define mechanical limits of angular actuator movement and to magnetically latch the actuator in one angular limit when the disk drive is not in use. Latch release is achieved by subjecting the rotary actuator to several cycles of oscillation at substantially the resonant frequency.

1 Claim, 5 Drawing Sheets

ROTARY ACTUATOR DISK DRIVE

RELATED APPLICATIONS

Application of George A. Drennan, Ser. No. 07/865,006, entitled Disk Drive Having an Improved Transducer Suspension Assembly, filed on Apr. 8, 1992 and assigned to the assignee of this invention.

Application of Mark Mastache et al, Ser. No. 07/865,013, entitled Disk Drive Having an Improved Transducer Suspension Assembly, filed on Apr. 8, 1992 and assigned to the assignee of this invention.

FIELD OF THE INVENTION

This invention relates generally to the rotary actuator type of disk drive and more particularly to the mechanical aspects of such drives as related to the rotary actuator assemblies.

BACKGROUND OF THE INVENTION

U.S. Pat. No. 5,034,837, to Schmitz, describes a rotary actuator type of disk drive employing a drive motor for powering the rotary actuator. The rotary actuator drive motor comprises a flat coil mounted on a coil support on the actuation. The coil moves in an arcuate path in a plane in a permanent magnetic field produced by a permanent magnetic structure. A magnetic actuator lock or latch comprises a latch pin on the coil support which moves in an arcuate path between opposed limit-stop surfaces on the stationary permanent magnet structure. The latch pin and limit-stop surfaces limit the angular movement of the rotary actuator and when the latch pin is in contact with either of the limit-stop surfaces magnetically latches the rotary actuator in that limit-stop position. Such limit-stop position, which secures the rotary actuator against rotary or angular movement, is the position occupied by the rotary actuator when the disk drive is not in use.

The rotary actuator arm structure, per se, is an integral part made of metal and comprises a pair of thin arms upon which the flat coil rides. The flat coil is secured to these arms by a bonding material stated to be a two part epoxy. The coil is wound separately, as a flat coil, and is configured in planform to fit the pair of arms. Diametrically opposite the coil support arms is an integral arm stack consisting of three axially spaced arms designed to receive, as by swaged connection, the mounting ends of respective load beams, the distal end of each of which mounts a transducer for scanning a surface of a disk.

Such an integral arm stack structure and load beam assembly is also seen in the patent to Coon et al, U.S. Pat. No. 4,829,329.

In the patent to Schmitz, the coil support arms being of metal are necessarily thin to avoid rotary actuator mass unbalance due to an overweight rotary actuator motor structure. This necessitates a close coupled coil moment arm which reduces the motor torque on the actuator. The actuator coil support arms being of metal present electrical insulation problems in mounting the flat coil. Mechanical instability may also be a problem especially in an environment where mechanical shock forces are high.

Structures of the type described by Schmitz and by Coon et al, while representing improvements in actuator design over earlier designs in achieving closer disk spacing, do not lend themselves to down size scaling to achieve disk drives of significantly less form factor.

SUMMARY OF THE INVENTION

Improvement with respect to prior art such as that of Schmitz and Coon et al is achieved according to the present invention, in which the best mode for practicing this invention provides a rotary actuator structure comprising a cylindrical or tubular hub journaled on a support member in the disk drive. One or more load beams are provided with mounting ends having openings therein fitted about said tubular hub and swaged thereto. A magnetic head on the distal end of each load beam scans the adjacent surface of a disk as the disk rotates and is moved by the actuator to different radial locations on the disk, according to conventional practice.

Movement of the rotary actuator structure is achieved by a rotary actuator motor comprising a plastic coil support arm. The plastic coil support arm has a mounting end provided with a metallic hub insert. The metallic hub insert has an opening therein which is also fitted about the tubular hub. Like the load beams, the metallic hub insert of the plastic arm is also swaged to the tubular hub with the plastic arm disposed in a position substantially diametrically opposite said one or more load beams. The plastic arm comprises a substantially planar section, herein called the bobbin section, radially removed from said mounting end and having edges defining the inner planform of a flat coil. The wire turns of the flat coil are wound directly upon these edges of the bobbin section. The plastic arm being an electrical insulator, poses no electrical shorting or eddy current problems, being of light weight reduces the angular movement of inertia, being of substantial cross-section, poses no mechanical stability problems and, provides a bobbin base which, with or without an adhesive, secures the coil on adjacent inner and side surfaces of the flat coil on the surfaces and edges of the bobbin section.

The rotary actuator motor assembly, in addition to powering the actuator, also incorporates the structural parts which together with structural parts of the stationary permanent magnet structure of the rotary actuator motor, establishes the mechanical limits of actuator angular movement. The rotary actuator motor comprises at least one permanent magnet structure secured to the support member in a position in flux linkage with the flat coil for any position of the flat coil within the mechanical limits of movement. This permanent magnet structure includes opposed limit stop faces. A latch projection, such as a latch pin, of magnetic material, projecting from the plastic actuator arm, moves with the flat coil on the plastic arm between the limit stop faces, and being of magnetic material, is linked by the flux of the permanent magnet.

Insert molding techniques are employed in fabricating the plastic arm. The metallic hub insert and the latch pin together with a weight for mass balancing the rotary actuator about its axis are secured in the mold for the plastic arm. Thereafter the fluid plastic is injected into the mold to integrate the inserts in the plastic arm.

The latch pin being of magnetic material sticks to either of the opposed surfaces of the permanent magnets structure. The magnetic latch function, however, is desired only for magnetically locking the actuator in that one position in which the heads are in contact with the disk in a parking area adjacent the center of the disk.

To obviate latching in the other mechanical limit, one side of the latch pin is embedded in plastic, in the insert molding process, of sufficient thickness to prevent latch pin contact with the other limit stop surface and thereby to obviate magnetic latching.

BRIEF DESCRIPTION OF THE DRAWINGS

The invention will be better understood by reference to the following specification when consider in conjunction with the accompanying drawings, in which.

DETAILED DESCRIPTION OF THE INVENTION

FIGS. 1 through 5 illustrate a rotary actuator type of disk drive embodying the best mode for practicing this invention. The disk drive comprises a support or base 1 upon which a disk stack 3 and a rotary actuator assembly 5 are rotatably mounted and sealed, within a housing, not shown. During operation, the disk stack 3 is rotated about the axis of a spindle 7 by an electric motor (not shown) at a predetermined constant speed, as is well known. The motor is secured to the base 1.

Figure 1:
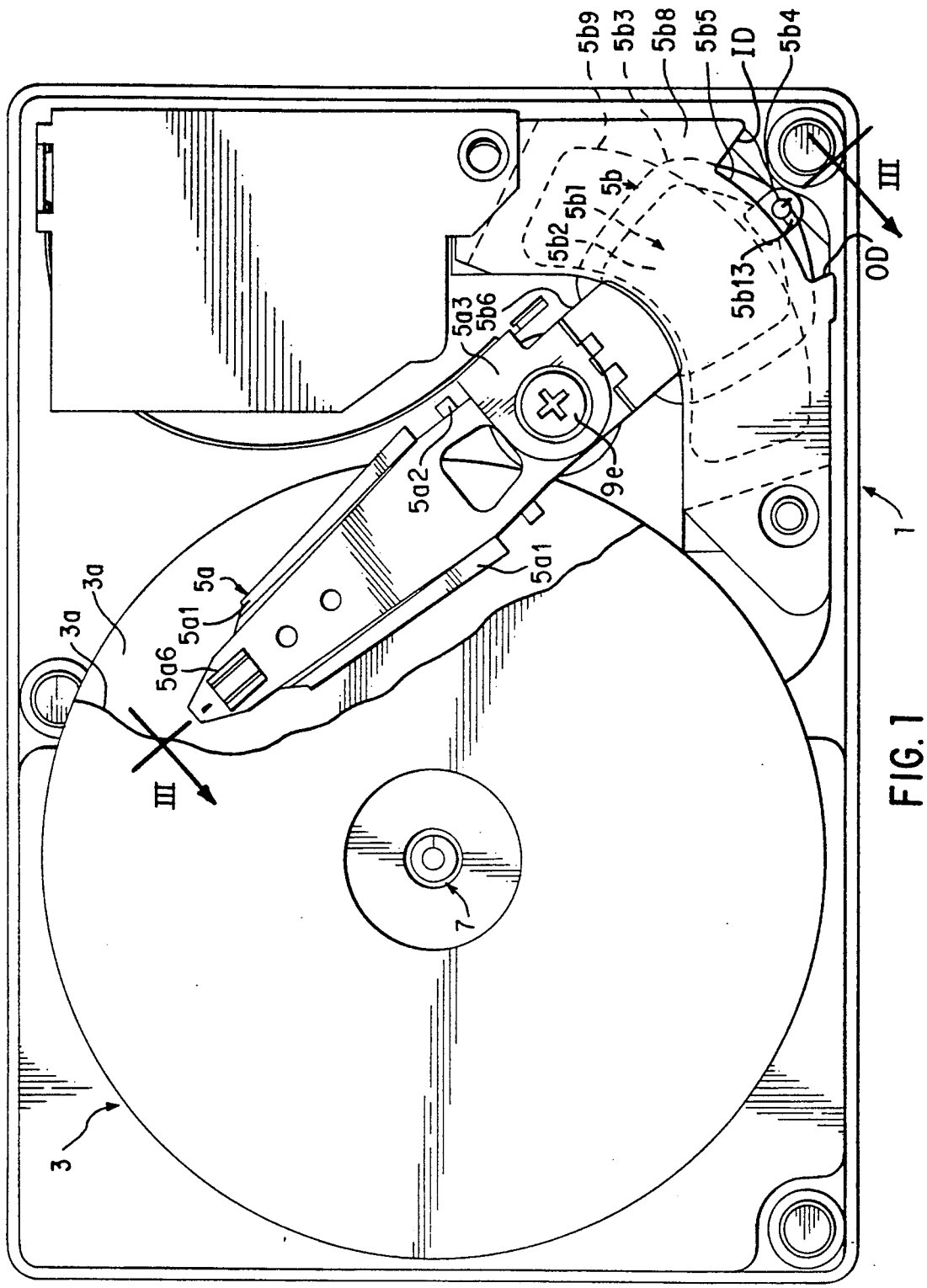
FIG. 1 is a plan view of a rotary actuator disk drive embodying the principles of this invention.
Figure 2:
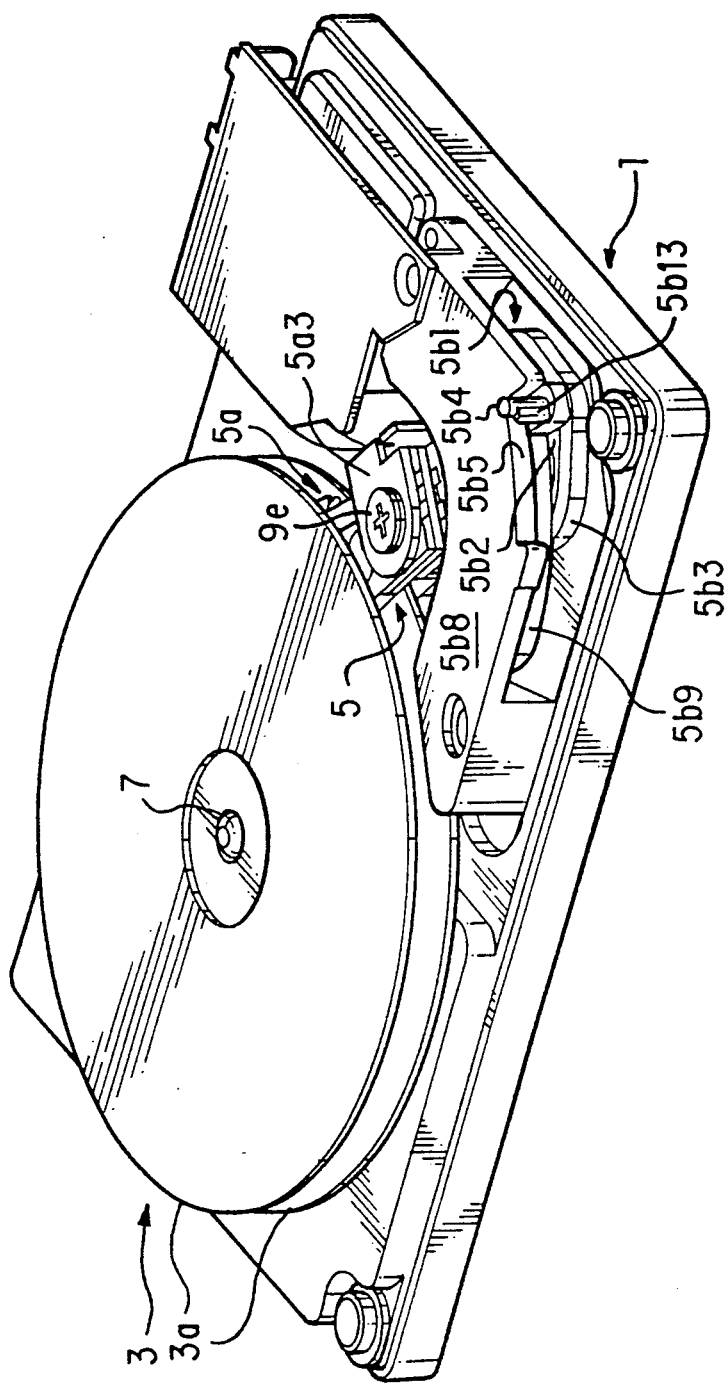
FIG. 2 is an isometric view of the disk drive of FIG. 1.
Figure 3:
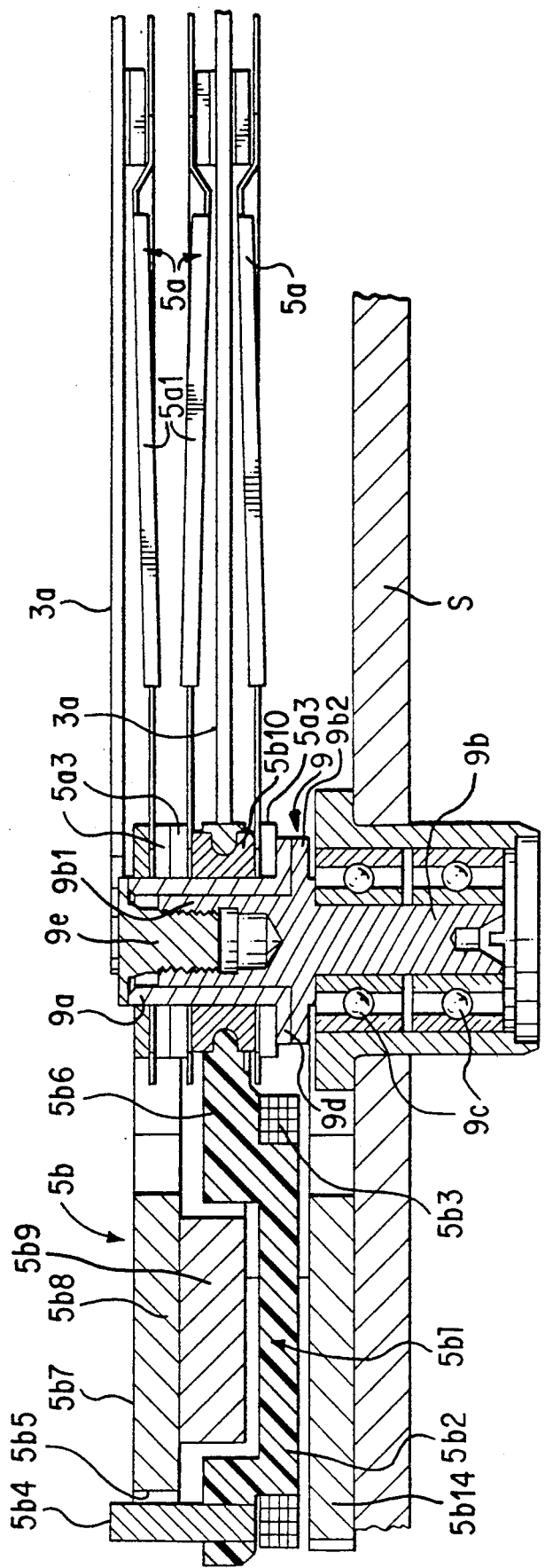
FIG. 3 is an enlarged sectional view of the rotary actuator assembly of FIG. 1 taken on the line III—III of FIG. 1.

The rotary actuator assembly 5 is assembled on a tubular member 9a, FIG. 3, which is a coaxial part of a two piece spindle 9, the other part 9b of which is journaled in a pair of coaxial bearings 9c secured in the base 1. The rotary actuator assembly 5, comprises one or more load beams 5a, having mounting ends with openings therein fitted about the tubular member, constituting an arm stack, and a drive motor 5b therefor. A plastic arm 5b1 has a coil support or bobbin section 5b2 for a flat coil 5b3. A mounting end 5b6 of the plastic arm 5b1 has a metallic hub insert 5b10 which has an opening 5b11 therein fitted about the tubular member and thus is stacked with a load beam or beams 5a, in a predetermined sequence, on the flange 9d of the tubular member 9a and secured thereto.

Angular movement of the rotary actuator assembly is limited by a crash-stop structure comprising a latch pin 5b4 of magnetic material, anchored in the plastic arm 5b1 near its outer end. The latch pin 5b4 projects upwardly adjacent an arcuate edge or recess 5b5, FIGS. 1, 2, 3, in an upper magnetic plate 5b8 of the rotary actuator motor 5b, in which position the latch pin 5b4 engages the ends, ID and OD, respectively, FIG. 1, of the arcuate recess 5b5, to provide a mechanical limit to angular movement of the rotary actuator assembly 5 in its inner and outer positions. The upper magnet plate 5b8 supports therebeneath a permanent magnet 5b9 and is magnetically connected to and supported by a bottom magnetic plate 5b14 seated upon the base or support 1 of the disk drive. The permanent magnet structure forms part of the rotary actuator motor 5b. The magnetic field of this permanent magnet structure links the flat coil 5b3 in any of its positions between its mechanical limits.

The structural details of the rotary actuator assembly 5 are best seen in the enlarged sectional view of FIG. 3.

Here, for a specific disk drive, the disk stack 3 comprises two axially spaced disks, each designated 3a. The number of disks employed within the mechanical limits, is determined by the amount of data storage that is required for a particular application. The invention may be practiced with one or more disks.

The spindle assembly 9 of the rotary actuator assembly 5 comprises a tubular hub or cylindrical member 9a which is the upper section of the spindle 9. The tubular hub 9a is preferably a slip fit over an extension 9b1 of a lower spindle section 9b and seats upon a flange 9b2 of the spindle and is thereby coaxially aligned to the lower spindle section 9b. The lower spindle section 9b is journaled in a coaxial bearing pair 9c in the base 1. This coaxial spindle assembly 9 is secured by a screw 9e. The screw 9e has a head which engages the upper end of the tubular hub 9a and a threaded stem which threads into a threaded axial hole in the extension 9b1 of the lower spindle section 9b.

The tubular hub 9a has a peripheral flange 9d. The peripheral flange may be continuous or may comprise circumferentially spaced sectors. All of the parts of this rotary actuator assembly are assembled as a stack seated on the flange 9d of the tubular hub 9a. In particular, the parts in this stack comprise a plurality of load beams 5a (see also FIGS. 4, 5) and the plastic arm 5b1, assembled on the tubular member 9a in a particular sequence and secured thereto.

Figure 4:
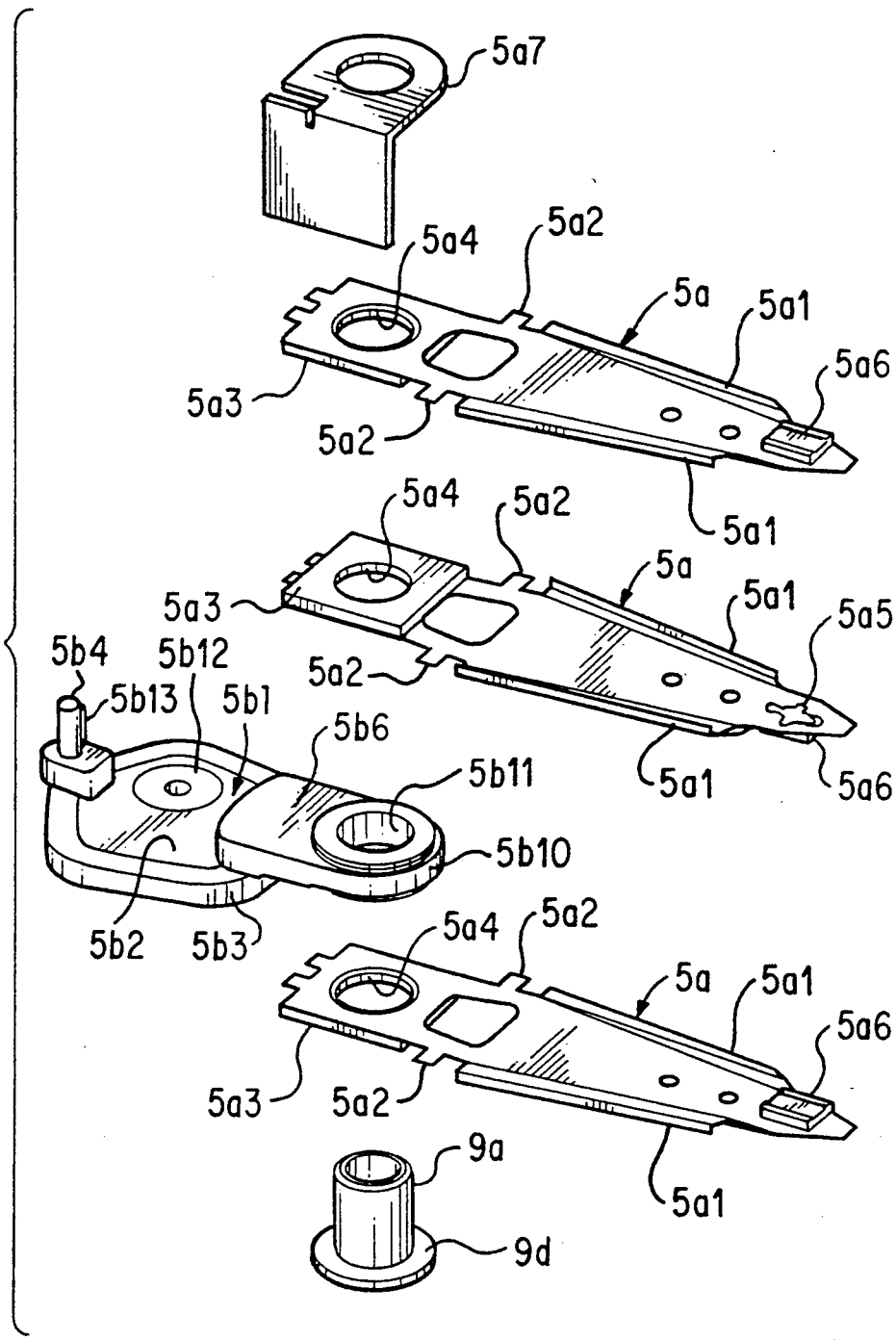
FIG. 4 is an exploded isometric view of a rotary actuator assembly according to this invention.
Figure 5:
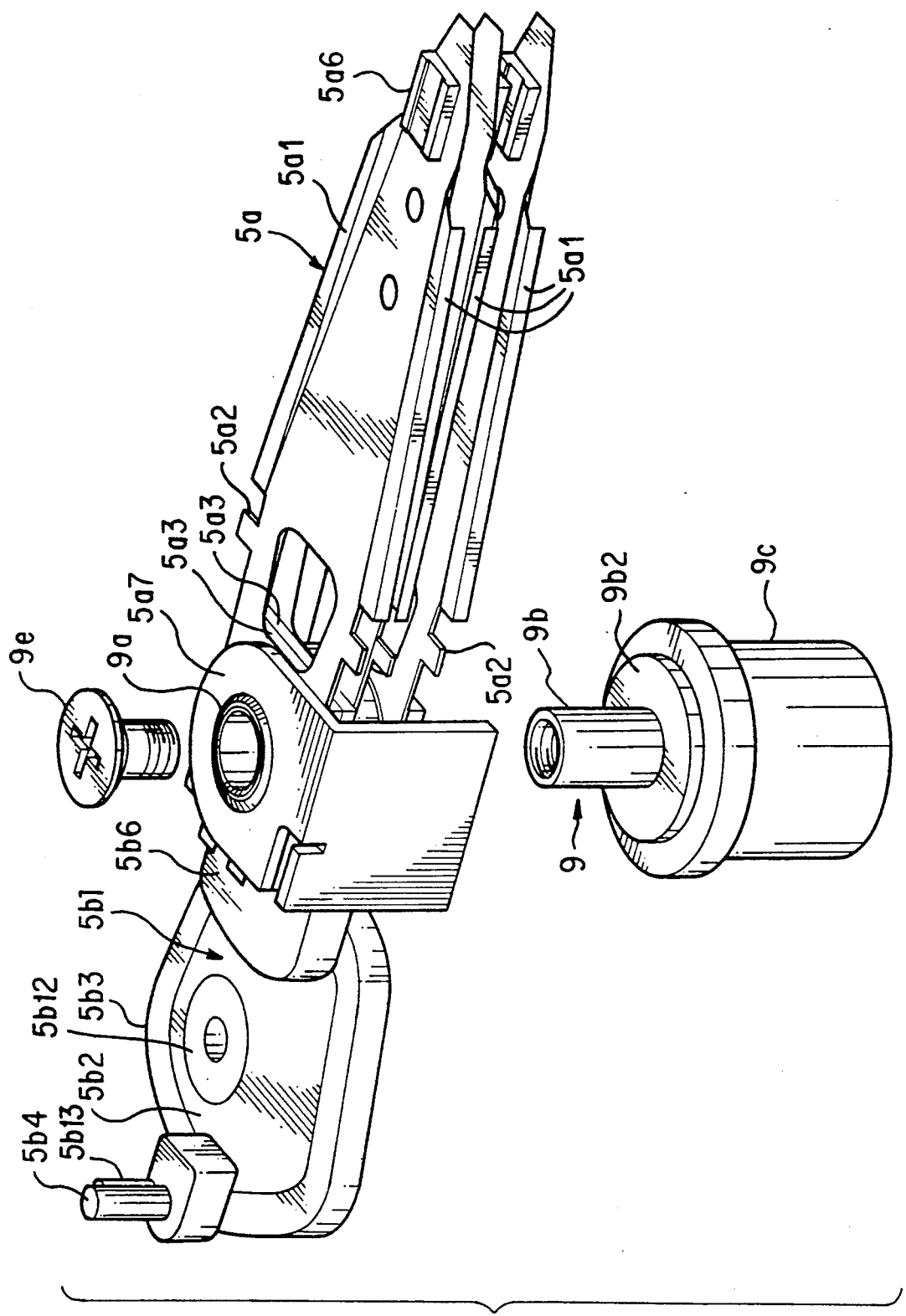
FIG. 5 is an isometric view of the three parts of the rotary actuator in exploded alignment for assembly.

The load beams 5a are configured as illustrated in FIGS. 4 and 5. In fabrication, they are etched from thin stainless steel sheet. In one particular embodiment of this invention, the stainless steel sheet was of the order of 3 mils thick. The flanges 5a1 are mechanically formed to provide the required load beam stiffness and stability. Tabs 5a2 are partially bent. Tab bending is completed at the time of installation of the transducer wires (not shown). The mounting end of each load beam comprises a reinforcing plate 5a3 which is welded to one side of the load beam, as viewed in FIG. 4. An opening or hole 5a4 is formed through the reinforcing plate 5a3 and the load beam 5a. The diameter of this hole or opening 5a4 is sufficient to provide a slip or sliding fit over the tubular hub 9a. The distal end of each load beam 5a has a leaf spring 5a5 attached thereto which functions as a gamble mount for a transducer 5a6, such as a magnetic head, the slider of which is bonded thereto as is well known. The transducer is mounted on the opposite side or face of the load beam 5a from that on which the reinforcing plate 5a3 is mounted.

The metallic hub insert 5b10 in the mounting end 5b6 of the plastic arm 5b1, is also provided with an opening or hole 5b11 therethrough of a diameter to provide a slip or sliding fit over the cylindrical portion of the tubular hub 9a.

The thickness of the reinforcing plates 5a3 and of the metallic hub insert 5b10 is related to the axial spacing of the disks. The minimum spacing of the disks is determined by the space required to clear the load beam/head assembly between the disks. Thus, for the assembly seen in FIG. 3, the reinforcing plates 5a3 when placed face-to-face axial space the load beams 5a a distance apart which together with any predetermined bend in the load beams, places each of the transducers 5a6 in the required spring loaded contact with a confronting surface of the axially spaced disks 3a. Similarly, the thickness of metallic hub insert 5b10 in the mounting end 5b6 of the plastic voice-coil arm 5b1, spaces the load beams 5a on each side thereof, as seen at the bottom of the stack in FIG. 3, to provide the required spring loading of the transducers against the respective opposite surfaces of the lowermost disk in the disk stack. The thickness of the metallic hub insert 5b10 at the opening 5b11 therein is equal to the disk thickness plus twice the required height for spring loading of the load beams 5a.

It is important that the rotary actuator be mass balanced about its spindle axis to minimize response to acceleration forces having components acting perpendicular to the rotary actuator axis. The use of an electrical insulating material such as the plastic named herein in fabricating the plastic arm 5b1, offers several advantages. As an electrical insulator there is no possibility of the coil shorting on the plastic arm and there will not be any effects due to eddy currents. A plastic material such as polyetherimide resin (GE ultem ®) is selected for the plastic arm 5b6 which is light in weight and dimensionally stable. This provides the opportunity to design a plastic arm configuration of sufficient cross-sectional dimension to achieve dimensional stability and structural rigidity, provide a coil bobbin section upon which the flat coil is wound directly, to insert mold with precision metallic parts such as the metallic hub insert 5b1o and latch pin 5b4, all without exceeding a weight limit for mass balancing, and, conveniently achieving mass balance by insert molding a balance weight 5b12 of non-magnetic material in the plastic arm 5b1.

The latch function is achieved by the use of a magnetic catch that takes advantage of the stray magnetic flux around the permanent magnet structure of the motor of the rotary actuator. The use of this stray flux permits the implementation of the latch without adding parts to the drive. The features required are easily incorporated into the arm 5b1 and the permanent magnet structure including the permanent magnet 5b9.

The steel pin 5b4, being insert molded into the plastic arm 5b1 eliminates the need to handle a separate part in the assembly process. This pin 5b4 contacts the ID crash stop that is part of the top magnet plate 5b8 and is magnetically attracted thereto by the stray magnetic flux at that location. The side of the latch pin 5b4 diametrically opposite to that side of the pin which contacts the ID crash stop is embedded in plastic 5b13 FIGS. 1, 2, 4 and 5, is part of the insert molding process. Thus, at the OD crash stop the plastic material spaces the latch pin 5b4 from contact with the OD crash stop face. The stray magnetic field linking the latch pin 5b4 in this circumstance is too weak to secure the latch pin at the OD crash stop and thus in effect eliminates magnetic attraction at that location. By this expedient, the crash stop function and the latch function are both accomplished with no additional parts required in the disk drive.

Advantageously the geometry of the plastic arm 5b1, particularly in the bobbin area 5b2, is such that the flat coil 5b3 may be wound directly on the plastic arm 5b1 with no need for a separate bobbin to be used to fabricate the coil and to thereafter require its installation by some means upon the plastic arm 5b1. Moreover, since the plastic arm is of an insulating material, the coil cannot short to the arm and there is no possibility of the development of eddy currents in the plastic arm.

There are two major functions of the latch. One function is to hold the actuator in an angular position with the magnetic heads in a landing zone on the surfaces of the disks during start/stop operation. In this operation the latch resists the skating torque of the heads on the disk. The other function of the latch is to hold the magnetic heads in the landing zone during non-operational mechanical shocks, such as those encountered in portable equipment.

The benefits of this latch design are listed herebelow:
1. No moving parts in the latch.
2. No extra parts are required. This results in a very low cost and a space efficient solution to the fabrication of small form-factor disk drives.
3. No field failures as a result of malfunction of the latch, including failure of the latch to release.
4. Low manufacturing yield loss from latch malfunction.
5. The latch requires no power draw during the operation of the drive.
6. No circuits or connectors are required to operate the latch.
7. The latch pin 5b4 extends beyond the top surface of the top magnet plate 5b8 so it can be used to drive the arm for servo writing.
8. Disk space is/not wasted for the purpose of providing latch clearance.

The resistance of the latch to shock forces is an important consideration. In one practical embodiment of this invention involving an application of the latch in a disk drive in the one to two inch form factor range, the holding torque of the latch is sized to resist the skating torque induced by the heads sliding on the disk surface during spin-up and spin-down.

The resistance to actuator arm rotation during a rotary shock when the drive is shut down, includes the latch holding torque plus the kinetic friction in the head/disk interface. Kinetic friction is used rather than static friction because during a rotary shock the disk pack will rotate somewhat relative to the heads.

Latch release considerations are also an important factor in the design of the latch particularly with respect to the holding torque and the application of torque of the character which will break the latch free. The holding torque of the latch is nearly equal to the torque of the actuator motor. Therefore, some assistance is required to escape the latch holding torque with a safe margin. This is done by exciting the actuator motor with an oscillating current sufficiently near the resonant frequency of the latched actuator arm to develop torque amplification. This may be done either with a certain number of cycles of reversing the maximum current to the motor and then on the next cycle in which the torque is in a direction to release the latch, holding the motor current high, or by applying an alternating current with a DC bias, the alternating current being near or at resonant frequency of the actuator arm, in which case again the arm breaks free of the latch when sufficient torque amplification is achieved.

What is claimed is:
1. A disk drive, comprising:
   a. a support;
   b. a disk assembly comprising at least one disk rotatably mounted for rotation about an axis on said support;
   c. a rotary actuator bearing hub;
   d. means rotatably mounting said bearing hub on said support for rotation about a bearing hub axis on said support substantially paralleling said disk axis;
   e. a transducer arm stack comprising at least one transducer arm secured to said bearing hub, said transducer arm having a distal end disposed adjacent a surface of said at least one disk;

f. a transducer mounted on said distal end of said at least one transducer arm;
g. an arm of electrical insulating material having a mounting end and having a distal end;
h. a metallic mounting fitting insert molded in said mounting end of said arm;
i. a latch pin of magnetic material insert molded in said distal end of said arm;
j. a motor coil on said arm, said coil being a substantially flat coil and defining a plane substantially perpendicular to the longitudinal axis of said latch pin;
k. means securing said metallic mounting fitting to said bearing hub, positioning said arm substantially diametrically opposite to said arm stack with the plane of said coil substantially perpendicular to said bearing hub axis and the axis of said latch pin substantially parallel to said bearing hub axis;
l. at least one permanent magnet on said support disposed in flux linkage with said coil and having latch surfaces disposed on opposite sides of said latch pin to engage said latch pin thereby limit movement of said arm,
m. said insulating material of said arm extends over one side of said latch pin in a position to engage one latch surface of said permanent magnet to thereby minimize magnetic coupling of said latch pin with said permanent magnet to avoid magnetic latching of said arm at that location.

* * * * *